Patented May 23, 1950

2,508,791

UNITED STATES PATENT OFFICE 2,508,791

PROCESS FOR PREPARING CARBAZOLE FROM ORTHO-NITROBIPHENYL

Millard Samuel Larrison, Verona, N. J., assignor to Allied Chemical & Dye Corporation, New York, N. Y., a corporation of New York No Drawing. Application October 9, 1948, Serial No. 53,749

4 Claims. (Cl. 260—315)

This invention relates to a process for preparing carbazole.

Carbazole has been prepared in the past by heating o-aminobiphenyl with oxygen in the presence of a catalyst, and also by heating a mixture of o-nitrobiphenyl and o-aminobiphenyl at relatively low temperatures.

Both of the above methods are unsatisfactory in requiring the use as starting materials of the relatively expensive o-aminobiphenyl.

I have now found that carbazole may be prepared more cheaply than has heretofore been possible, directly from o-nitrobiphenyl according to my invention wherein mixtures of o-nitrobiphenyl and hydrogen in the vapor phase are subjected to elevated temperatures in the presence of a hydrogenation catalyst.

In carrying out the process of my invention, o-nitrobiphenyl is heated to a temperature above its melting point of about 245° C., for example to between about 250° C. and about 300° C., preferably to between about 260° C. and about 265° C. Hydrogen gas, which may be preheated, if desired, to about 250° C. is passed through the hot liquid o-nitrobiphenyl to vaporize portions thereof and carry it in the hot hydrogen stream. The hot vapor mixture of hydrogen and o-nitrobiphenyl is then passed over a hydrogenation catalyst such as vanadium oxide ($V_2O_5$), aluminum oxide ($Al_2O_3$) or various combinations of the oxides of chromium, molybdenum, vanadium, aluminum, preferably a catalyst comprising $V_2O_5$ supported on $Al_2O_3$ "Alundum." The passage of the hot vapors over the catalyst takes place in a heated zone maintained at a temperature between about 400° C. and about 700° C., preferably between about 615° C. and about 625° C. The passage of the mixed hydrogen-o-nitrobiphenyl vapors may be continued as long as desired, the process being operated either as a batch process or continuously, by renewal of the o-nitrobiphenyl in the heated container. The vapor mixtures emerging from the hydrogenation chamber may be recovered by condensation, for example by passing into a chilled container maintained at about 20° C., whereupon the vapors condense to a wax-like solid, containing substantial quantities, up to about 30% or more, of carbazole. Pure carbazole may readily be recovered from the wax-like hydrogenation product, if desired, by any suitable known means, for example by dissolving it in suitable solvents such as, for example, ortho dichlorobenzene etc., and cooling to effect crystallization, or by distillation, or by other known process of recovery and purification.

The mechanism of the reaction which takes place in carrying out the process of my invention is not clearly understood, nor is it known whether the changes take place directly or with intermediate steps. However, the ultimate results of the reaction may be illustrated by the equation below:

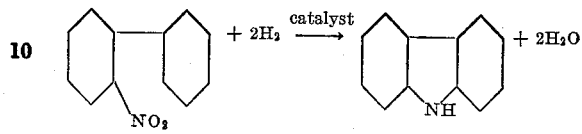

The proportions of o-nitrobiphenyl and hydrogen in the vapors subjected to the hot catalyst may vary widely. However, optimum proportions appear to be between about 50 mol per cent and 75 mol per cent of hydrogen and between about 50 and 25 mol per cent orthonitrobiphenyl, preferably about 67 mol per cent hydrogen and 33 mol per cent orthonitrobiphenyl in the vapors passed over the catalyst. Pressures of 5 to 25 p. s. i., e. g., atmospheric pressure may be used.

Carbazole is useful in the manufacture of dyestuffs, as a stabilizer for explosives and as an intermediate in organic synthesis.

The following examples serve further to illustrate my invention. Parts are by weight.

Example 1

Ninety-two parts of o-nitrobiphenyl were heated in an iron container to between 260° and 265° C. in a salt bath. Hydrogen gas at 20° C. was passed through the heated o-nitrobiphenyl liquid in the heated pot, which progressively vaporized portions of the o-nitrobiphenyl. The stream of hydrogen and vaporized o-nitrobiphenyl thus formed was passed through a heated tube packed with a hydrogenation catalyst comprising "Alundum" ($Al_2O_3$) coated with vanadium oxide ($V_2O_5$), at a temperature maintained at between about 615° C. and 625° C. At the end of one-half hour, all the o-nitrobiphenyl has been vaporized and passed with the hydrogen stream through the heated tube. The vapor emerging from the reaction tube was condensed by cooling. The product was a light-brown waxy solid containing 33% of carbazole as determined by spectrophotometric analysis, a yield of 30% of theoretical.

Example 2

One hundred parts of o-nitrobiphenyl were heated to 260-265° C. in an iron container in a salt bath. Hydrogen gas at 20° C. was passed through the hot liquid o-nitrobiphenyl, progressively to vaporize the o-nitrobiphenyl. The mixed vapors of hydrogen and o-nitrobiphenyl thus produced were passed through a heated tube packed with an "Alundum" ($Al_2O_3$) catalyst at a temperature between 600° C. and 615° C. After about 1 hour all the o-nitrobiphenyl had been vaporized and passed with the hydrogen stream through the heated tube. The vapors emerging from the reaction tube were condensed to a solid product which was found by spectrophotometric analysis to contain 22% of carbazole, a yield of 20% of theoretical.

While the above describes the preferred embodiments of my invention, it will be understood that departures may be made therefrom within the scope of the specification and claims.

What is claimed is:

1. In a process for the preparation of carbazole, the step which comprises subjecting a mixture of o-nitrobiphenyl and hydrogen in the vapor phase to temperatures between about 400° C. and about 700° C. in the presence of a hydrogenation catalyst.

2. In a process for the preparation of carbazole, the step which comprises subjecting a mixture of o-nitrobiphenyl and hydrogen in the vapor phase to temperatures between about 615° C. and about 625° C. in the presence of a vanadium oxide catalyst.

3. In a process for the preparation of carbazole, the steps which comprise melting o-nitrobiphenyl, passing therethrough a stream of hydrogen gas and passing the mixed o-nitrobiphenyl-hydrogen vapors thus produced over a vanadium oxide catalyst at temperatures between about 615° C. and about 625° C.

4. In a process for the preparation of carbazole, the steps which comprise melting o-nitrobiphenyl, passing therethrough a stream of hydrogen gas and passing the mixed o-nitrobiphenyl-hydrogen vapors thus produced over an aluminum oxide catalyst at temperatures between about 600° C. and about 615° C.

MILLARD SAMUEL LARRISON.

REFERENCES CITED

The following references are of record in the file of this patent:

UNITED STATES PATENTS

| Number | Name | Date |
|---|---|---|
| 2,292,808 | Waterman et al. | Aug. 11, 1942 |